(12) United States Patent
Mai et al.

(10) Patent No.: US 6,877,873 B2
(45) Date of Patent: Apr. 12, 2005

(54) STRUCTURE OF ILLUMINATION APPARATUS

(75) Inventors: Che-Kuei Mai, Hsinchu (TW); Hong-Yu Lin, Hsinchu (TW)

(73) Assignee: Toppoly Optoelectronics Corp., Miao-Li (TW)

( * ) Notice: Subject to any disclaimer, the term of this patent is extended or adjusted under 35 U.S.C. 154(b) by 85 days.

(21) Appl. No.: 10/458,101

(22) Filed: Jun. 10, 2003

(65) Prior Publication Data

US 2004/0252480 A1 Dec. 16, 2004

(51) Int. Cl.[7] .............................. F21V 8/00; F21V 7/04
(52) U.S. Cl. ......................................... 362/31; 362/27
(58) Field of Search ..................................... 362/31, 27

(56) References Cited

U.S. PATENT DOCUMENTS 6,280,044 B1 * 8/2001 Kusakabe ..................... 362/31
6,752,506 B1 * 6/2004 Suzuki et al. .................. 362/31
2004/0130880 A1 * 7/2004 Min et al. ...................... 362/31

* cited by examiner

Primary Examiner—Stephen Husar
Assistant Examiner—James W Cranson
(74) Attorney, Agent, or Firm—Moser, Patterson & Sheridan, L.L.P.

(57) ABSTRACT

A structure of an illumination apparatus is described. The structure has a light guide rod arranged at one lateral side of a light guide plate, and plural light sources located below the light guide rod. The light guide rod has at least one tilt plane formed thereon in order to guide the light emitted from the light sources to the light guide plate such that uniform planar light could be generated therefrom. A plurality of notches is formed in the tilt plane, and a plurality of depressed or protruding dispersion dots is formed on an out-going plane of the light guide rod. The structure further includes an anti-reflection layer positioned between the light guide rod and the light guide plate.

20 Claims, 6 Drawing Sheets

STRUCTURE OF ILLUMINATION APPARATUS

BACKGROUND OF THE INVENTION

1. Field of Invention

The present invention relates to a structure of an illumination apparatus. More particularly, the present invention relates to a structure of an illumination apparatus for generating uniform planar light, increasing brightness and increasing illumination efficiency of a liquid crystal display.

2. Description of Related Art

Liquid crystal display (LCD) has so many advantages, including high picture quality, small volume, light weight, low driving voltage and low power consumption, that LCDs are widely applied in electronic products such as medium or small-sized portable televisions, mobile phones, videos, notebooks, and monitors for desktop computers and projection-type televisions. Therefore, as time goes by, LCDs are gradually replacing cathode ray tube (CRT) monitors.

The present LCDs are not applied only in medium-sized or small-sized panel LCD products, such as small-sized portable televisions, mobile phones, videos, notebooks and monitors for desktop computers, but also large-sized panel LCD products, such as LCD televisions. However, large-sized panel products face the problems of how to generate uniform planar light projected onto the liquid crystal display panel, how to provide enough brightness and how to increase illumination efficiency of a LCD.

Reference is made to FIG. 1A, which is a schematic view showing a structure of a conventional light guiding system 1. Conventionally, the light sources 12 are located at two ends of the light guide rod 11. The light emitted from the light sources 12 is guided through the vertical notches 111 and then to the light guide plate 13. Finally, the light is guided through the notches 131 of the light guide plate 13 and a planar light can be projected from the light guide plate 13 onto the liquid crystal display panel (not shown). However, existence of the vertical notches 111 of the light guide rod 11 makes the generated planar light projected from the light guide plate 13 onto the liquid crystal display panel a rippled planar light rather than a uniform planar light. Hence, a diffusion plate 14 is further required to disperse the light first. On the other hand, the light sources can be only configured at two ends of the light guide rod 11. In this design, extraordinary light sources cannot be added so that the design cannot be applied in the large-sized panel LCD products which require high brightness.

Reference is made to FIG. 2, which is a schematic view showing a structure of a conventional illumination apparatus 2. The tilt planes 211 and the vertical notches 212 are formed in the light guide rod 21. The light sources 22 are located below the tilt planes 211. The light emitted from the light sources 22 is guided through the tilt planes 211 and the vertical notches 212 and to the light guide plate (not shown). Certainly, a planar light can also be generated from the light guide plate and projected onto the liquid crystal display panel (not shown). However, existence of the tilt planes 211 and the vertical notches 212 also makes the generated planar light projected from the light guide plate onto the liquid crystal display panel a rippled planar light rather than a uniform planar light. A diffusion plate is also required to disperse the light. Although this kind of design can increase the number of the located light sources, existence of the tilt planes 211 still limits the number of the light sources 22. This structure also cannot be applied in the large-sized panel LCD products. Besides, the light emitted from the light sources 22 must be reflected from the tilt planes 211 to the vertical notches 212 first, and then guided to the light guide plate. The indirect guiding mechanism makes the illumination efficiency lower.

On the other hand, although plural light guide rods and the light sources can be also added to meet the requirement of brightness, the volume of the LCD will consequently increase. Accordingly, there is a need for the conventional a structure of an illumination apparatus to be improved.

SUMMARY OF THE INVENTION

For the forgoing reasons, it is therefore an objective of the present invention to provide a structure of an illumination apparatus for generating uniform planar light, increasing brightness and increasing illumination efficiency of a liquid crystal display.

Another objective of the present invention is to provide a structure of an illumination apparatus that increases brightness of a liquid crystal display without further increasing the volume of the LCD.

According to the present invention, the structure of the illumination apparatus includes a light guide rod arranged at one lateral side of a light guide plate and a plurality of light sources located below the light guide rod. The light guide rod includes at least one tilt plane, which directly guides light emitted from the light sources to the light guide plate and uniform planar light emitted from the light guide plate is therefore generated.

A plurality of notches are formed in the tilt plane, and a plurality of dispersion dots are formed on an out-going plane of the light guide rod for dispersing light emitted from the light guide rod to the light guide plate.

The structure of the illumination apparatus further includes an anti-reflection layer positioned between the light guide rod and the light guide plate.

It is to be understood that both the foregoing general description and the following detailed description are examples only, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

In the drawings.

DESCRIPTION OF THE PREFERRED EMBODIMENTS

Figure 1:
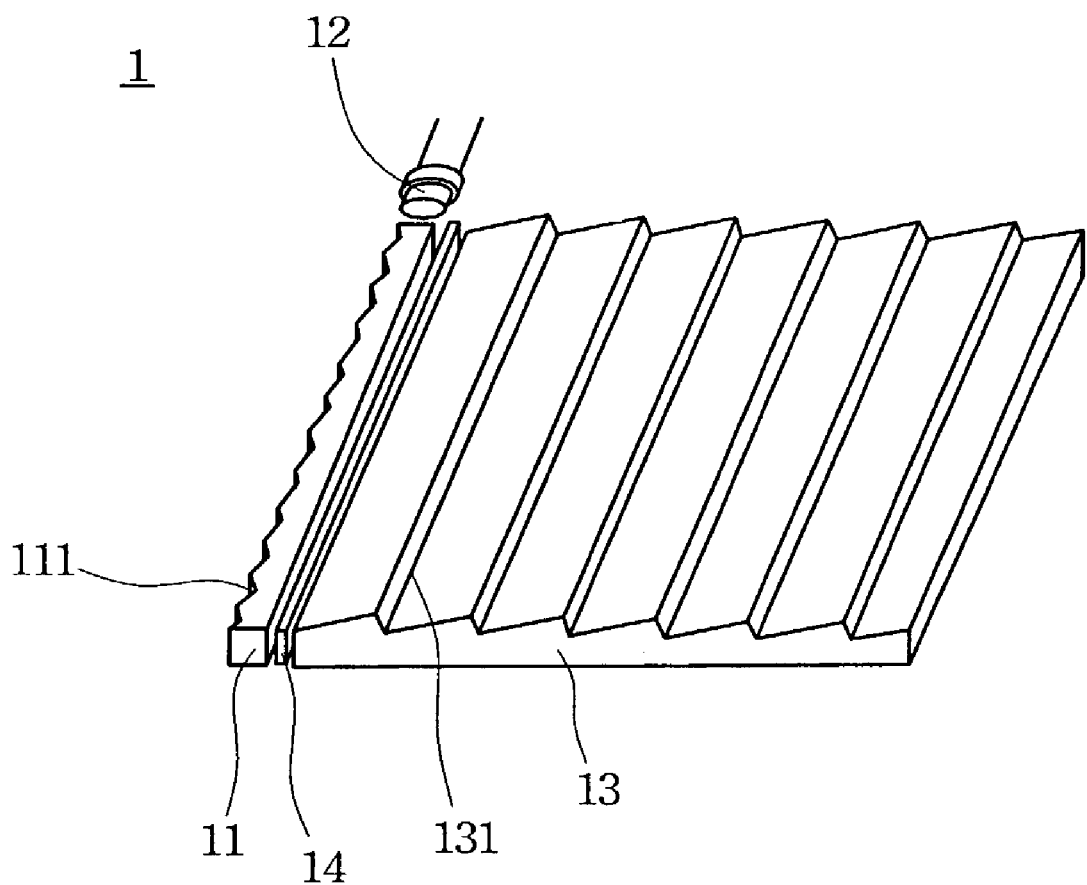
FIG. 1 is a schematic view showing a structure of a conventional light guiding system.
Figure 2:
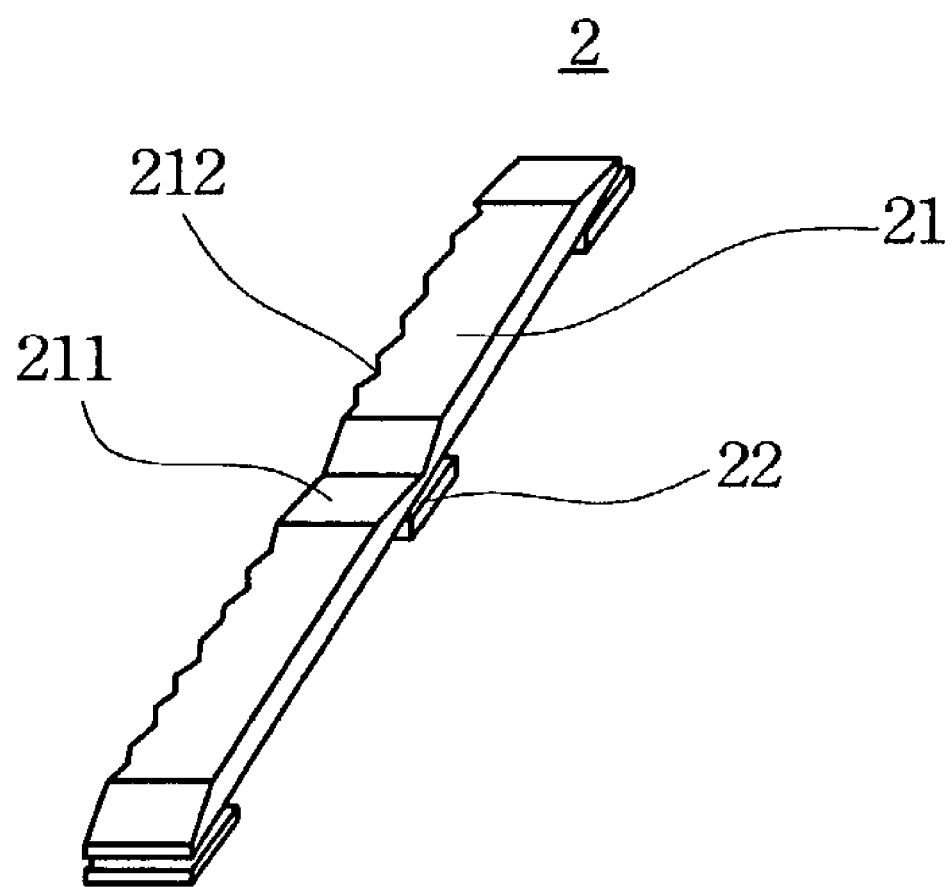
FIG. 2 is a schematic view showing a structure of a conventional illumination apparatus.

Reference will now be made in detail to the present preferred embodiments of the invention, examples of which are illustrated in the accompanying drawings. Wherever possible, the same reference numbers are used in the drawings and the description to refer to the same or like parts.

Figure 3A:
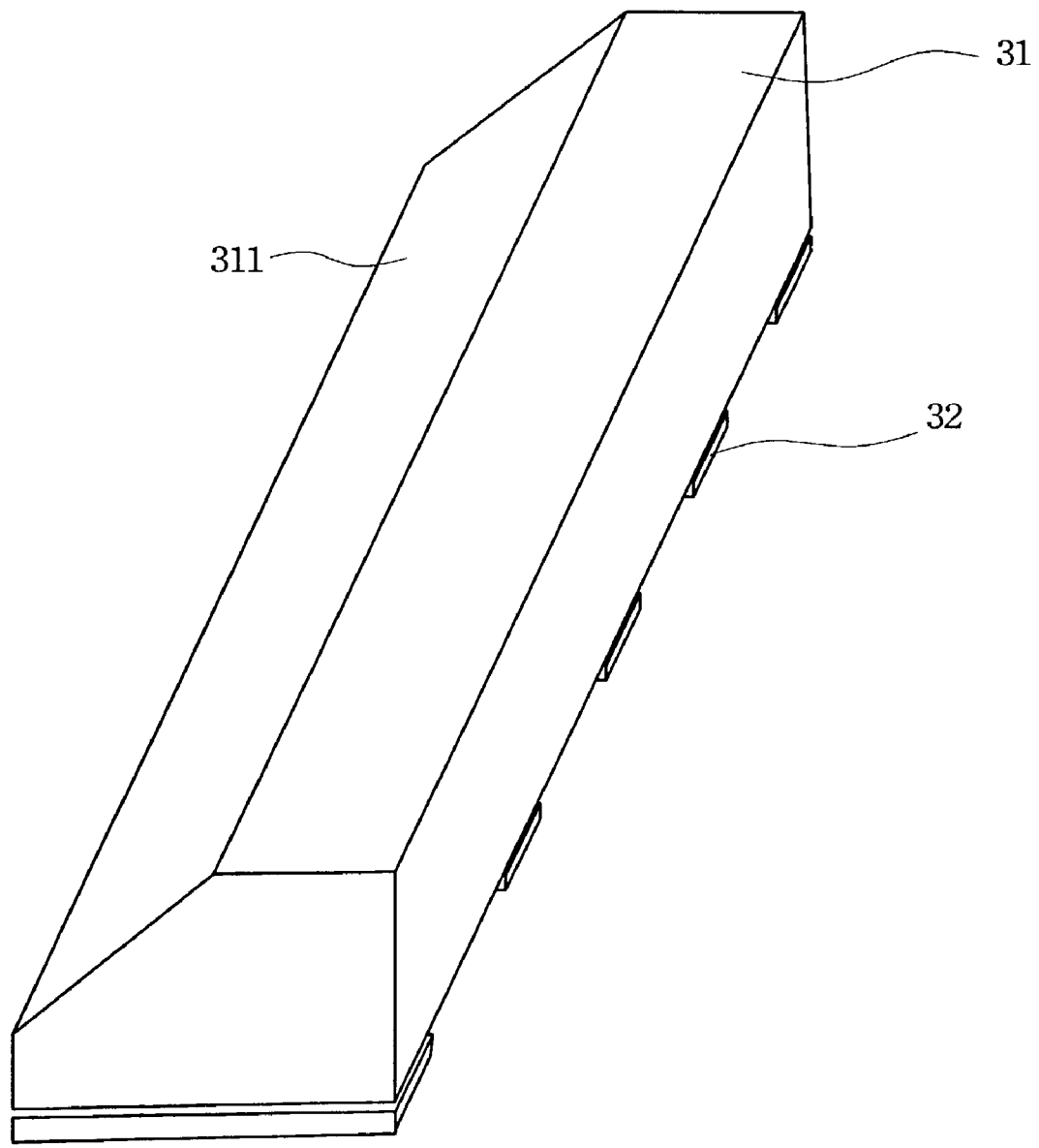
FIG. 3A is a schematic view showing a structure of an illumination apparatus in accordance with the first embodiment of the present invention.
Figure 4:
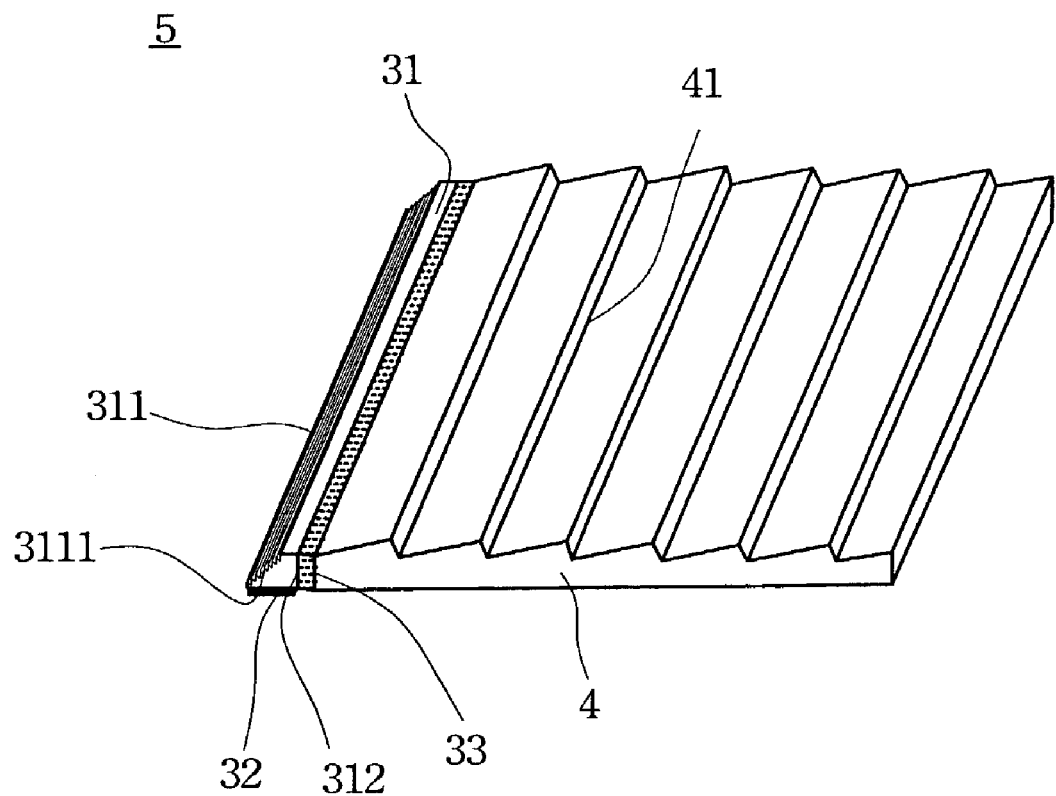
FIG. 4 is a schematic view showing a structure of a light guiding system including the second embodiment of the present invention as shown in FIG. 3B.

Reference is made to FIG. 3A, which is a schematic view showing a structure of an illumination apparatus 3 in accordance with the first embodiment of the present invention. The illumination apparatus 3 includes a light guide rod 31 having at least one tilt plane 311 and plural light sources 32 located below the light guide rod 31. The tilt plane 311 directly guides light emitted from the light sources 32 to the light guide plate 4 as shown in FIG. 4. Preferably, the light sources 32 are separated by an equal distance, and each light source 32 can be a spot light source, e.g. light emitting diode (LED).

Figure 3B:
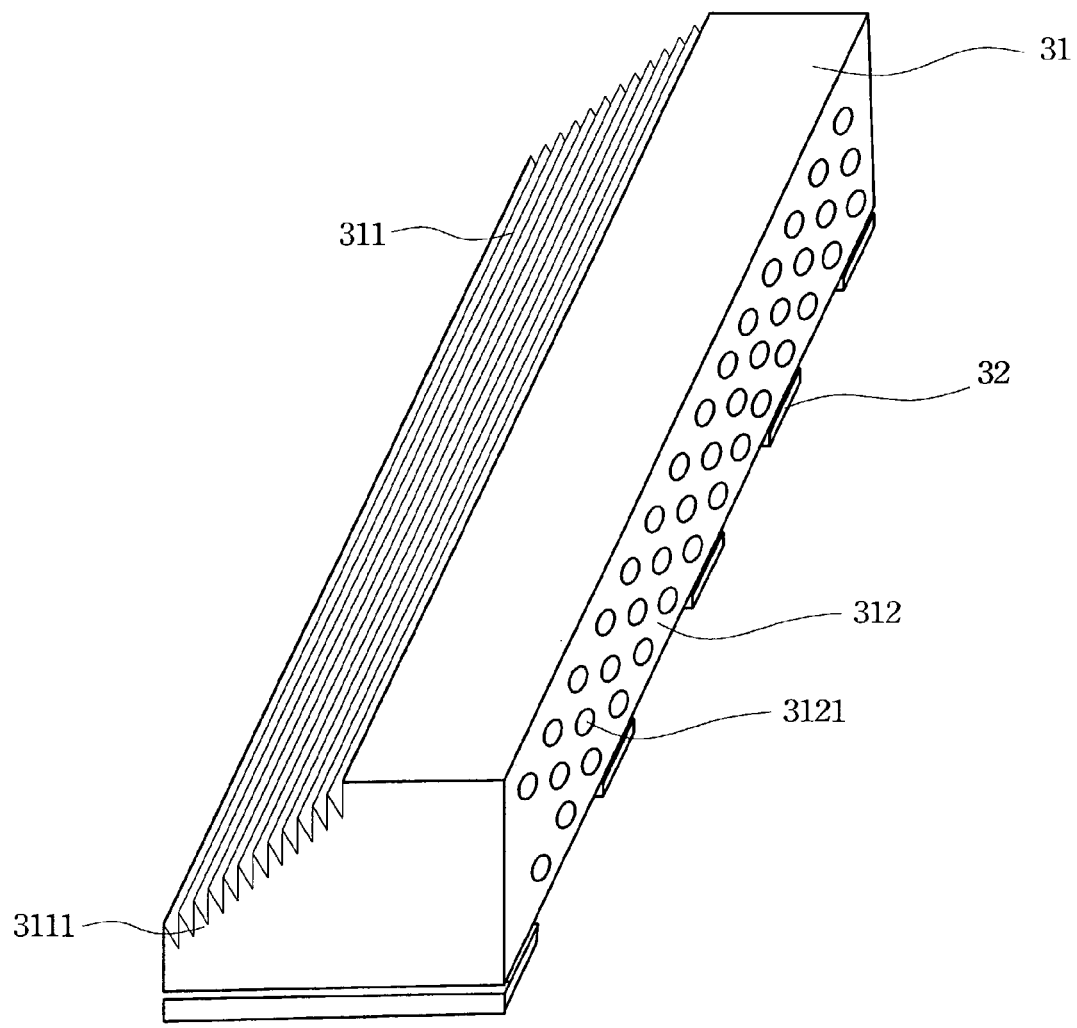
FIG. 3B is a schematic view showing a structure of an illumination apparatus in accordance with the second embodiment of the present invention.

Reference is made to FIG. 3B, which is a schematic view showing a structure of an illumination apparatus 3 in accordance with the second embodiment of the present invention. According to the illumination apparatus 3 of the present invention, a plurality of horizontal notches 3111 can be further formed in the tilt plane 311 to increase illumination efficiency of the LCD. In addition, a plurality of dispersion dots 3121 can be further formed on an out-going plane 312 of the light guide rod 31 for dispersing light emitted from the light guide rod 31 to the light guide plate 4 as shown in FIG. 4.

The dispersion dots 3121 can be depressed dispersion dots or protruding dispersion dots. The depressed dispersion dots can be integrally formed with the light guide rod 31 or by an etching step. Protruding dispersion dots can be formed integrally with the light guide rod 31 or by a dipping step. Preferably, the protruding dispersion dots are made of transparent resin or other equivalent material which can achieve the function of dispersing light.

Reference is made to FIG. 4, which is a schematic view showing a structure of a light guiding system 5 including the second embodiment of the present invention as shown in FIG. 3B. The light guide rod 31 is disposed at one lateral side of the light guide plate 4. The light emitted from the light sources 32 is guided through the tilt plane 311 of the light guide rod 31 and the horizontal notches 3111 of the tilt plane 311 to the light guide plate 4. The light is then guided through the notches 41 of the light guide plate 4 and projected onto the liquid crystal display panel (not shown), and a planar light can thus be generated.

Preferably, the illumination apparatus further includes an anti-reflection layer 33 positioned between the light guide rod 31 and the light guide plate 4. The anti-reflection layer 33 is used to reduce the reflection effect of the guided light and hence increase illumination efficiency. The anti-reflection layer 33 can made of UV curing resin. Preferably, a refraction index of the anti-reflection layer 33 ranges from about 1.4 to 1.7. According to the present invention, two or more light guide rods can be disposed at two opposite lateral sides of the light guide plate.

According to the present invention, a number of the light sources located below the light guide rods can be increased without further increasing volume of the LCD; therefore brightness of LCD is increased. Moreover, the tilt plane can directly guide light emitted from the light sources to the light guide plate; therefore illumination efficiency of LCD is increased.

In addition, as shown in the first embodiment of the present invention and with reference to FIG. 3A, because the light guide rod includes no vertical notches, the light projected onto the liquid crystal display panel from the light guide plate is not a rippled planar light. As shown in the second embodiment of the present invention and with reference to FIG. 3B, even if horizontal notches are formed in the tilt plane of the light guide rod for further increasing illumination efficiency and dispersion dots are formed on an out-going plane of the light guide rod for dispersing light projected onto the light guide plate from the light guide rod, the light projected onto the liquid crystal display panel from the light guide plate is still not a rippled planar light. Because no diffusion plate is required to disperse the light, the present invention lowers the cost of manufacturing the illumination apparatus.

Figure 5A:
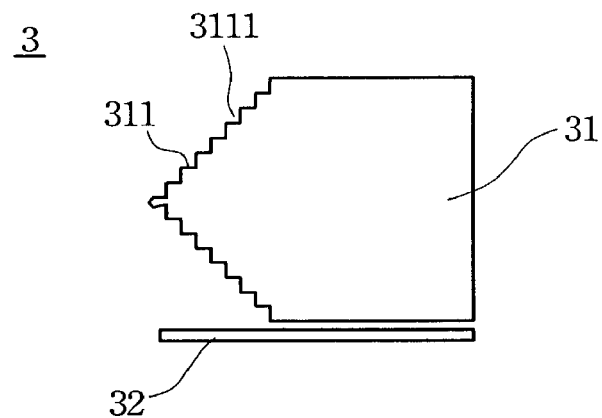
FIG. 5A is a schematic, cross-sectional view showing a structure of an illumination apparatus in accordance with the third embodiment of the present invention.
Figure 5B:
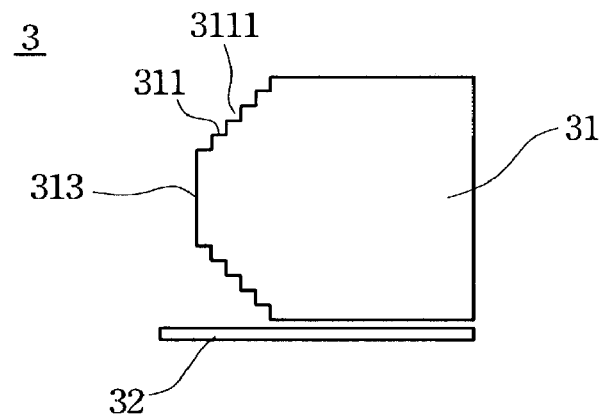
FIG. 5B is a schematic, cross-sectional view showing a structure of an illumination apparatus in accordance with the fourth embodiment of the present invention.
Figure 5C:
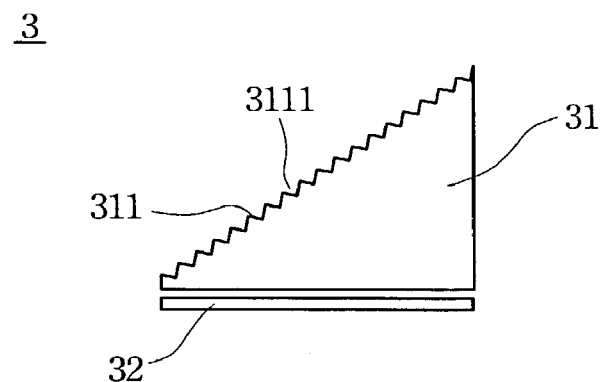
FIG. 5C is a schematic, cross-sectional view showing a structure of an illumination apparatus in accordance with the fifth embodiment of the present invention.

According to the present invention, a cross-section of the light guide rod 31 can be other shapes, such as those shown in FIGS. 5A–5C. More than one tilt plane are included in other varieties as long as these tilt planes can directly guide light emitted from the light sources 32 to the light guide plate. In FIG. 5A, a cross-section of the light guide rod is in a shape of a pentagon by truncating two adjacent corners of a rectangle. In FIG. 5B, a cross-section of the light guide rod is in a shape of a hexagon by truncating two adjacent corners of a rectangle. In FIG. 5C, a cross-section of the light guide rod is in a shape of a right triangle.

In addition to the horizontal notches formed in the tilt plane 311, vertical notches can be formed in other planes as long as the generated light projected onto the liquid crystal display panel from the light guide plate is not a rippled planar light. For example, in FIG. 3B, horizontal notches 3111 are formed in the tilt plane 311 of the light guide rod 31 and vertical notches (not shown) can be formed in the vertical plane 313 disposed between two tilt planes 311.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A structure of an illumination apparatus, said structure comprising:
   a light guide rod arranged at one lateral side of a light guide plate, said light guide rod comprising at least one tilt plane, a plurality of horizontal notches being formed in said tilt plane; and
   a plurality of light sources located below said light guide rod, wherein said tilt plane directly guides light emitted from said light sources to said light guide plate and uniform planar light emitted from said light guide plate is therefore generated.

2. The structure according to claim 1, wherein a cross-section of said light guide rod is in a shape of a pentagon by truncating a corner of a rectangle.

3. The structure according to claim 1, wherein a cross-section of said light guide rod is in a shape of a pentagon by truncating two adjacent corners of a rectangle.

4. The structure according to claim 1, wherein a cross-section of said light guide rod is in a shape of a hexagon by truncating two adjacent corners of a rectangle.

5. The structure according to claim 4, wherein a plurality of vertical notches is formed in a vertical plane disposed between two tilt planes of said hexagon.

6. The structure according to claim 1, wherein a cross-section of said light guide rod is in a shape of a right triangle.

7. The structure according to claim 1, wherein a plurality of dispersion dots are formed on an out-going plane of said light guide rod for dispersing light emitted from said light guide rod to said light guide plate.

8. The structure according to claim 7, wherein said dispersion dots are selected from a group consisting of depressed dispersion dots and protruding dispersion dots.

9. The structure according to claim 1, wherein said structure further comprises an anti-reflection layer positioned between said light guide rod and said light guide plate.

10. A structure of a light guiding system adapted for a liquid crystal display panel, said structure comprising:
   a light guide plate;
   at least two light guide rods arranged at two opposite lateral sides of said light guide plate, a plurality of dispersion dots being disposed on an out-going plane of said light guide rod, each light guide rod comprising at least one tilt plane, and a plurality of horizontal notches being disposed in said tilt plane; and
   a plurality of light sources located below said light guide rod, wherein said tilt plane directly guides light emitted from said light sources to said light guide plate and uniform planar light emitted from said light guide plate is therefore generated.

11. The structure according to claim 10, wherein a cross-section of said light guide rod is in a shape of a pentagon by truncating a corner of a rectangle.

12. The structure according to claim 10, wherein a cross-section of said light guide rod is in a shape of a pentagon by truncating two adjacent corners of a rectangle.

13. The structure according to claim 10, wherein a cross-section of said light guide rod is in a shape of a hexagon by truncating two adjacent corners of a rectangle.

14. The structure according to claim 13, wherein a plurality of vertical notches is formed in a vertical plane disposed between two tilt planes of said hexagon.

15. The structure according to claim 10, wherein a cross-section of said light guide rod is in a shape of a right triangle.

16. The structure according to claim 10, wherein said dispersion dots are adapted for dispersing light emitted from said light guide rod to said light guide plate.

17. The structure according to claim 10, wherein said dispersion dots are selected from a group consisting of depressed dispersion dots and protruding dispersion dots.

18. The structure according to claim 10, wherein said structure further comprises an anti-reflection layer positioned between said light guide rod and said light guide plate.

19. The structure according to claim 18, wherein a refraction index of said anti-reflection layer ranges from about 1.4 to 1.7.

20. The structure according to claim 19, wherein said light sources are spot light sources and separated by an equal distance.

\* \* \* \* \*